United States Patent

[11] 3,619,261

[72] Inventors Harry E. Dunholter
 4851 S. Arvilla Drive, Toledo, Ohio 43623;
 James C. Jones, 3304 River Road, Toledo, Ohio 43614
[21] Appl. No. 7,243
[22] Filed Jan. 30, 1970
[45] Patented Nov. 9, 1971

[54] COATING FOR FIBERBOARD AND CONTAINERS FORMED THEREFROM
 11 Claims, No Drawings
[52] U.S. Cl.................................................... 117/95,
 117/154, 117/155 R, 117/167, 161/229, 229/3.5 R, 260/404.5, 260/584 R
[51] Int. Cl....................................................... B44d 5/08, B44d 5/00
[50] Field of Search............................................ 117/95, 96, 149, 154, 167, 155; 252/51.5 A; 260/583 DD, 584 R, 404; 161/229, 406; 229/3.5

[56] References Cited
UNITED STATES PATENTS
3,383,028 5/1968 Brander.......................... 229/16
3,484,271 12/1969 Kaliski et al. .................. 117/154 X Primary Examiner—Alfred L. Leavitt
Assistant Examiner—Edward G. Whitby
Attorneys—D. R. Birchall and E. J. Holler ABSTRACT: Free release coating for fiberboard surfaces by applying to the surface the reaction product of fatty acids and diethanolamine. This coating is made by heating the reaction product of a fatty acid and diethanolamine in the presence of a diluent of an alkyl glycol at a sufficient temperature and for a suitable time until a uniform mixture is obtained. The mixture is applied to a fiberboard surface of a container without any post curing to provide a coating which will freely release camelback rubber upon storage in the container.

COATING FOR FIBERBOARD AND CONTAINERS FORMED THEREFROM

THE INVENTION

This invention generally relates to release coatings for receptacles. More specifically, the invention relates to the coating composition comprising a mixture of an alkane glycol and the end product of the reaction of an alkanolamine with a fatty acid. The latter reaction product is disclosed in U.S. Pat. No. 3,436,247, issued Apr. 1, 1969 to Harry E. Dunholter.

Fiberboard type products are widely used for various containers for packaging and shipping rubber products, particularly camelback rubber of the type used in the manufacture of tires. Camelback rubber is a highly sticky material used to recap tires. Because of this property, it is a problem in this industry to package and ship the rubber to customers in fiberboard containers without having the rubber adhere to the interior walls of the container. In order to overcome this problem, functional coatings were developed to prevent the rubber from sticking to the fiberboard. These coatings are referred to in the art as "release coatings."

Heretofore, release coatings were used which contained silicone. These coatings were post cured by heating at temperatures of 350° F. for 30–60 seconds to completely polymerize all the silicone.

The disadvantage of the silicone base coating is that the base material, if not completely cured, will offset into the surface of the rubber. During later fabrication wherein the contaminated camelback rubber is caused to adhere to the core of a tire to be recapped, the layer of uncured silicone would prevent complete vulcanization of the new tread to the old core or, even more dangerously, would cause a seemingly good recapped tire to fail under pressure and temperature of road driving because of the latent defects.

It is desirable to develop a release coating for camelback rubber which can be easily applied to a fiberboard container, which does not contain silicone or any other contaminant, and which does not require a post curing operation to polymerize the coating.

Consequently, it is an object of this invention to provide a release coating composition to be used on fiberboard surfaces which will prevent camelback rubber or other similar materials from adhering to the surface of fiberboard.

It is another object to provide a free release coating for fiberboard containers for camelback rubber or other similar materials, which coating does not contain silicone or other contaminants.

It is an object of this invention to provide a free release coating for containers for camelback rubber or other similar materials which does not require a post curing treatment to perfect the coating.

Finally, it is an object of this invention to provide a free release coating for fiberboard containers to store camelback rubber which is surface active and which will not penetrate into the fiberboard at temperatures in the range of about 90° to 180° F.

The above objects were achieved by coating the fiberboard surface with a mixture of the reaction product of a fatty acid with an alkanolamine as disclosed in U.S. Pat. No. 3,436,247, issued Apr. 1, 1969 to H. E. Dunholter and a diluent of an alkyl glycol.

The composition of the reaction product is represented by the formulas

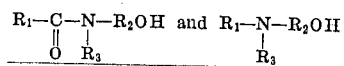

wherein $R_1$ is a saturated aliphatic group containing from eight to 22 carbon atoms, $R_2$ and $R_3$ are independently hydrogen, straight or branch chain alkyl containing from one to eight carbon atoms, straight or branched chain alkanol having from one to eight carbon atoms, aryl, substituted and unsubstituted amino or substituted and unsubstituted amide.

The alkanolamide component of the alkanolamide-alkanolamine composition comprises from about 60 to about 90 percent of the mixture. The relative percentages of these components can be varied by varying the reaction conditions.

The fatty acid alkanolamide and alkanolamine compositions are produced by the reaction of an alkanolamine with a fatty acid. Alkanolamines adapted for use are represented by the formula

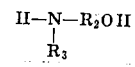

wherein $R_2$ and $R_3$ are as defined above.

Specific alkanolamines may be utilized along with mixtures of these compounds.

Although the prior art teaches the use of polyethylene glycols in conjunction with a silicone base as a lubricating anti-abrasive coating and the use of fatty acid alkanolamides as an anti-abrasion coating, the prior art does not teach the use of fatty acid alkanolamides free of silicones for the purpose of providing a release coating for fiberboard in contact with camelback rubber.

The subject invention is adapted to utilize a wide range of alkyl glycols. The glycols adapted to use in the preparation of the coating composition of this invention include, for example, ethylene glycol, propanediol, butanediol, hexanediol, heptanediol, nonediol, decanediol, other straight and branch chain saturated glycols with up to 12 carbon atoms; combinations of the above glycols, i.e., diethylene glycol; polyethylene glycols having an average molecular weight in the range of about 200 to at least 6,000 and preferably in the range of about 200 to 1,000, and polypropylene glycols, polybutylene glycols and triols.

In this invention, a glycol additive is used as a diluent to deposit the fatty acid alkanolamine and alkanolamide base upon the surface of the fiberboard, the diluent being absorbed into the board. It is of course understood that any suitable diluent can be used which results in the final mixture having a viscosity generally in the range of about 30 c.p.s. to 10,000 c.p.s. at 25° C., A.S.T.M and preferably in the range of about 5,000 to 10,000 c.p.s. and which results in a final mixture having a melting point in the range of about 80° to 180° F. and preferably in the range of about 100° to 140° F.

It is important that the release coating has a melting point in this range because of the temperature at which camelback rubber generally is packaged. In order for this coating to act as a release agent, it must completely cover the exposed fibers on the surface of the fiberboard. If the coating has a melting point less than the packaging temperature of the rubber, about 100° F., it has a tendency, depending upon the thickness of the coating, to impregnate the fiberboard, thereby requiring the application of more coating until the fiberboard is completely saturated in order to cover the surface fibers.

It is also understood that the desired viscosity of the mixture may be varied by the addition of a suitable diluent to adapt the coating to various modes of application.

According to one feature of this invention, the reaction product of an alkanolamine with a fatty acid disclosed in U.S. Pat. No. 3,436,247, heretofore referred to, is heated to about 140° F. in order to melt the product. To the liquid alkanolamine and alkanolamide base is then added a diluent, diethylene glycol, to a concentration of generally about 2 percent to 50 percent by weight and preferably about 10 percent to 20 percent. After the base and the glycol are thoroughly agitated to obtain a uniform mixture, they are allowed to cool to room temperature—and then homogenized if necessary. The coating may then be applied to the fiberboard up to a density of about 2 lbs. per M.S.F. (1,000 square feet) using the press machinery which the customer uses to apply printing inks. The advantage of using the coating of this invention over prior coatings is that the coated fiberboard need not be post cured by heating to polymerize the coating as in the case of silicone base coatings. Rather, the coating is allowed to dry at room temperature and the diluent is absorbed into the fiberboard in a short time, usually 1 to 5 minutes after it has been applied.

According to another feature of this invention, the reaction product of an alkanolamine with a fatty acid, disclosed in U.S. Pat. No. 3,436,247 heretofore referred to, is heated to about 140° F. in order to melt the product. To the liquid alkanolamine-alkanolamide base is then added the glycol diluent, hexylene glycol, to a concentration of generally about 2 percent to 50 percent by weight and preferably about 10 percent to 20 percent. After the base and the glycol are thoroughly agitated to obtain a uniform mixture, it is allowed to cool to room temperature and then homogenized, if necessary. The coating may then be applied to the fiberboard up to a density of about 2 lbs. per M.S.F. using the same press machinery which the customer uses to apply printing.

Other available glycols which may be used as diluents include the families of alkyl glycols. However, because of the high cost of these glycols, they are not deemed as suitable as the diethylene and hexylene glycols.

The following examples are illustrative of the manner of practicing this invention, it of course being understood that the examples are not to be construed as limiting the invention, but merely set forth as exemplary of the manner of using the invention.

EXAMPLE I

A coating composition was prepared by heating to about 140° F. 98 parts by weight of the reaction product of a fatty acid alkanolamide and alkanolamine as disclosed in U.S. Pat. No. 3,436,247 issued Apr. 1, 1969 to Harry E. Dunholter, until a liquid is obtained.

That reaction product is prepared by mixing about 70 weight percent of a mixture comprising 45 percent by weight of stearic acid and 55 percent by weight of palmitic acid with about 30 percent of diethanolamine. The reaction is carried out at a temperature of about 150° C. for about 4 hours at atmospheric pressure.

To the 98 parts of the liquid reactant is added about two parts by weight of the diluent, diethylene glycol. It is then agitated until a uniform mixture is obtained. Finally, the mixture is allowed to cool to room temperature to form a lardlike substance. If complete uniformity has not yet been obtained, the cooled mixture may be run through a homogenizer or through a three-roller mill. The viscosity of the coating composition was about 5,000 to 10,000 c.p.s. The coating was then applied to the wire side of 69 lb. Fourdrinier kraft linerboard by means of a Vandercook proof press. The coating pickup was no greater than 2.2 lbs. dry per M.S.F. This coated fiberboard was allowed to dry for several hours and was tested for release by contacting the board to camelback rubber. The coating was found satisfactory for release purposes since no fibers adhered to the rubber upon removal.

EXAMPLE II

As stated in the procedure in example I, a coating composition was prepared by heating to about 140° F. the reaction product of a fatty acid alkanolamide and alkanolamine as disclosed in U.S. Pat. No. 3,436,247 issued Apr. 1, 1969 to Harry E. Dunholter, until a liquid is obtained.

To about 90 parts by weight of this liquid is added about 10 parts by weight of hexylene glycol. The same mixing and cooling procedure was then followed as in example I until a uniform mixture was obtained.

The coating composition was then applied to fiberboard in the same manner as stated in example I. The results from the test indicated that this coating showed good release qualities since no fibers adhered to the rubber.

EXAMPLE III

The procedure of example I was again followed except that the glycol addition was about 20 parts by weight of hexylene glycol to about 80 parts by weight of the reaction product of a fatty acid alkanolamide and alkanolamine. The test indicated that this coating exhibited excellent release properties.

While the manner of making and using the present invention has been described above, it will of course be apparent that modifications are possible.

We claim:

1. An article of manufacture comprising a fiberboard substrate with a release coating on at least part of the surface of said fiberboard, said coating consisting of a mixture of a base substance consisting essentially of a fatty acid alkanolamide and alkanolamine and a diluent consisting essentially of a glycol which produces a final viscosity of the coating within the range of about 1,000 to 10,000 c.p.s.

2. An article of manufacture comprising a fiberboard substrate with a release coating on at least part of the surface of said fiberboard, said coating consisting of a mixture of base substance consisting essentially of a fatty acid alkanolamide and alkanolamine, said alkanolamide component being about 60 to about 90 percent of said base substance, and a diluent of glycol, said diluent consisting essentially of about 2 to 50 percent by weight of said mixture.

3. The article claimed in claim 2 wherein said base substance consists of about 50 to 98 percent of the coating mixture and said diluent consists of about 2 to 50 percent of said coating mixture.

4. The article claimed in claim 2 wherein said diluent consists of a straight or branched chain saturated alkyl glycol having from one to 12 carbon atoms.

5. An article of manufacture comprising a fiberboard substrate with a coating on at least part of the surface of said fiberboard, said coating consisting of a mixture of base substance consisting essentially of a fatty acid alkanolamide and alkanolamine, said alkanolamide component being about 60 to about 90 percent of said base substance, and a diluent of alkyl glycol, said diluent consisting essentially of about 2 to 50 percent by weight of said mixture.

6. The article claimed in claim 5 wherein said base substance consists of about 50 to 98 percent of the coating mixture and said diluent consists of about 2 to 50 percent of said coating mixture.

7. The article claimed in claim 5 wherein said diluent consists of a straight or branched chain alkyl glycol having from one to 12 carbon atoms.

8. The article claimed in claim 7 wherein the alkyl glycol consists of polyethylene glycol.

9. A release coating applied to fiberboard containers for use in storing camelback rubber, said coating consisting essentially of a mixture of about 50 to 98 parts of a base material and about two to 50 parts of a diluent, said base material consisting essentially of a fatty acid alkanolamide and alkanolamine, said alkanolamide being about 60 to about 90 percent of said base material, and a diluent consisting essentially of alkyl glycol.

10. The release coating as claimed in claim 9, wherein the diluent consists of diethylene glycol.

11. The release coating as claimed in claim 9 wherein the diluent consists of hexylene glycol.

* * * * *

PO-1050
(5/69)

UNITED STATES PATENT OFFICE
CERTIFICATE OF CORRECTION

Patent No. 3,619,261          Dated November 9, 1971

Inventor(s) Harry E. Dunholter and James C. Jones

It is certified that error appears in the above-identified patent and that said Letters Patent are hereby corrected as shown below:

In the heading, insert ---Assignee Owens-Illinois, Inc. Toledo, Ohio---.

Signed and sealed this 16th day of May 1972.

(SEAL)
Attest:

EDWARD M. FLETCHER, JR.          ROBERT GOTTSCHALK
Attesting Officer          Commissioner of Patents